(12) United States Patent
Xu

(10) Patent No.: US 12,309,043 B2
(45) Date of Patent: May 20, 2025

(54) INTENT PROCESSING METHOD, APPARATUS, AND SYSTEM

(71) Applicant: HUAWEI TECHNOLOGIES CO., LTD., Shenzhen (CN)

(72) Inventor: Ruiyue Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/400,787

(22) Filed: Aug. 12, 2021

(65) Prior Publication Data

US 2021/0377111 A1 Dec. 2, 2021

Related U.S. Application Data

(63) Continuation of application No. PCT/CN2020/074776, filed on Feb. 11, 2020.

(30) Foreign Application Priority Data

Feb. 14, 2019 (CN) .......................... 201910116083.3

(51) Int. Cl.
*H04L 41/5054* (2022.01)
*H04L 41/08* (2022.01)
(Continued)

(52) U.S. Cl.
CPC ........ *H04L 41/5054* (2013.01); *H04L 41/084* (2013.01); *H04L 41/0886* (2013.01);
(Continued)

(58) Field of Classification Search
CPC . H04L 41/145; H04L 41/0806; H04L 41/084; H04L 41/0889; H04L 41/0894;
(Continued)

(56) References Cited

U.S. PATENT DOCUMENTS 10,530,697 B2 * 1/2020 Fourie ................ H04L 41/0806
10,992,543 B1 * 4/2021 Rachamadugu .... H04L 41/0869
(Continued)

FOREIGN PATENT DOCUMENTS

CN 101043379 A 9/2007
CN 102385860 A 3/2012
(Continued)

OTHER PUBLICATIONS

3GPP TR 28.812 V0.3.0 (Jan. 2019), 3rd Generation Partnership Project; Technical Specification Group Services and System Aspects; Telecommunication management; Study on scenarios for Intent driven management services for mobile networks (Release 16), Jan. 2019, 3GPP, 3GPP TR 28.812 V0.3.0 (Jan. 2019) (Year: 2019).*
(Continued)

*Primary Examiner* — Gregory Todd
(74) *Attorney, Agent, or Firm* — Rimon PC

(57) ABSTRACT

Embodiments of this application provide an intent processing method and related apparatus and a system, to improve architecture flexibility and evolvability. In one embodiment, a management device receives an intent from a requirement device through an intent-driven management service (IDMS) interface, where the intent includes information about an intent object, an intent action, and an intent-specific parameter, and the intent is used to indicate to the management device to perform, on an object indicated by the information about the intent object, the intent action. The management device obtains a configuration parameter based on the received intent. The management device configures, based on the obtained configuration parameter, a network or a service managed by the management device.

16 Claims, 7 Drawing Sheets

(51) Int. Cl.
*H04L 41/084* (2022.01)
*H04L 41/0894* (2022.01)
*H04L 41/0895* (2022.01)
*H04L 41/122* (2022.01)
*H04L 41/14* (2022.01)
*H04L 41/5041* (2022.01)
*H04L 41/04* (2022.01)
*H04L 41/0806* (2022.01)
*H04L 41/0896* (2022.01)
*H04L 41/40* (2022.01)

(52) U.S. Cl.
CPC ...... *H04L 41/0889* (2013.01); *H04L 41/0894* (2022.05); *H04L 41/0895* (2022.05); *H04L 41/122* (2022.05); *H04L 41/145* (2013.01); *H04L 41/5048* (2013.01); *H04L 41/04* (2013.01); *H04L 41/0806* (2013.01); *H04L 41/0896* (2013.01); *H04L 41/40* (2022.05)

(58) Field of Classification Search
CPC ............. H04L 41/0895; H04L 41/0886; H04L 41/122; H04L 41/5054; H04L 41/5048; H04W 4/50
See application file for complete search history.

(56) References Cited

U.S. PATENT DOCUMENTS

| | | | |
|---|---|---|---|
| 11,075,805 B1* | 7/2021 | A | H04L 41/145 |
| 11,086,709 B1* | 8/2021 | Ratkovic | G06F 11/0709 |
| 11,283,691 B1* | 3/2022 | A | H04L 41/5051 |
| 2008/0189250 A1 | 8/2008 | Cha et al. | |
| 2016/0241436 A1 | 8/2016 | Fourie et al. | |
| 2017/0149917 A1 | 5/2017 | Liu | |
| 2018/0152884 A1* | 5/2018 | Hu | H04W 8/18 |
| 2021/0409291 A1* | 12/2021 | A | H04L 41/0886 |

FOREIGN PATENT DOCUMENTS

| | | |
|---|---|---|
| CN | 103777943 A | 5/2014 |
| CN | 104346158 A | 2/2015 |
| CN | 108024270 A | 5/2018 |
| CN | 109219020 A | 1/2019 |
| CN | 109245916 A | 1/2019 |
| EP | 3937440 A1 | 1/2022 |

OTHER PUBLICATIONS

3GPP TS 28.531 V15.1.0 (Dec. 2018), 3rd Generation Partnership Project; Technical Specification Group Services and System Aspects; Management and orchestration; Provisioning; (Release 15), Dec. 2018, 3GPP, 3GPP TS 28.531 V15.1.0 (Year: 2018).*
3GPP TS 28.530 v15.1.0 (Dec. 2018), 3rd Generation partnership project; Technical Specification Group Services and System Aspects; Management and Orchestration—Concepts, Use Cases and Requirements (Release 15) (Year: 2018).*
3rd Generation Partnership Project; Technical Specification Group Services and System Aspects; Management and orchestration; Concepts, use cases and requirements (Release 15), 3GPP TS 28.530 V15.1.0 (Dec. 2018) (Year: 2018).*
3GPP TSG-SA5 Meeting #123, S5-191124, pCR 28.812 Add description of using domain specific language for intent expression, Montreal, Canada, Jan. 21-25, 2019, pp. 1-3. (Year: 2019).*
Huawei, Reorganize clause 5 to categorize the scenarios. 3GPP TSG-SAS Meeting #123, Montreal, Canada, Jan. 21-25, 2019, S5-191120, 8 pages.
Huawei, Add introduction and standard consideration for IDMS. 3GPP TSG-SAS Meeting #125, Newport Beach, US, Apr. 8-12, 2019, S5-193133, 2 pages.
China Telecommunications et al: "New WI Proposal for GR Intent Aware Network Autonomy", ETSI Draft; ENI(19)009_034R1, Apr. 3, 2019, XP014340853, 11 pages.
Aklamanu Fred et al: "Intent-Based Real-Time 5G Cloud Service Provisioning", 2018 IEEE Globecom Workshops (GC Wkshps), IEEE, Dec. 9, 2018, XP033519264, 6 pages.
3GPP TR 28.812 V0.3.0:"3rd Generation Partnership Project;Technical Specification Group Services and System Aspects;Telecommunication management; Study on scenarios for Intent driven management services for mobile networks (Release 16)",Jan. 2019,total 22 pages.
3GPP TSG-SA5 Meeting #124, S5-192128, Update concept of IDMS,Huawei,Taipei,Taiwan Feb. 25-Mar. 1, 2019,total 2 pages.
3GPP TSG-SA5 Meeting #123,S5-191063,pCR 28.812 Abstraction versus layering, Ericsson ,Montreal,Canada, Jan. 21-25, 2019,total 3 pages.

* cited by examiner

INTENT PROCESSING METHOD, APPARATUS, AND SYSTEM

CROSS-REFERENCE TO RELATED APPLICATIONS

This application is a continuation of International Patent Application No. PCT/CN2020/074776, filed on Feb. 11, 2020, which claims priority to Chinese Patent Application No. 201910116083.3, filed on Feb. 14, 2019. The disclosures of the aforementioned applications are hereby incorporated by reference in their entireties.

TECHNICAL FIELD

Embodiments of this application relate to the field of communications technologies, and in particular, to an intent processing method and apparatus, and a system.

BACKGROUND

With rapid development of communications technologies, including introduction of vertical industries, an increase of terminal devices, and diversity of services, networks of operators become increasingly complex. Complex networks will increase O&M difficulties. The operators focus on simple, efficient, and low-cost network O&M and fast network deployment to meet diversified services.

Currently, in a network or network device management system, a form of a network instruction is used to manage a network device to implement network operation. For example, the network device is managed by using man machine language (MML) instructions. Complexity and fast update and iteration of the network device make network instructions complex, and the operators need to input a large amount of manpower to learn and master operation instructions of different devices or different device vendor management systems. Therefore, managing the network device by using the network instructions is complex and costly, and cross-vendor integration is difficult.

Therefore, an intent management interface is introduced into a 5G network management system. A user of a network expresses an intent to a management device through the intent management interface, and the management device converts the intent into a specific network instruction to manage the network device. This improves management efficiency, reduces implementation complexity, and reduces O&M costs.

Based on different roles that propose intents, the intents are classified, for example, into a communication service consumer (CSC) intent, a communication service provider (CSP) intent, and a network operator (NOP) intent. Different intent management interfaces are designed for different types of intents. A three-layer intent interface, including a CSC-intent interface, a CSP-intent interface, and a NOP-intent interface, is introduced in an existing 3GPP standard. The CSC-intent interface is an interface mainly specific to service management of an end user or an end user group, the CSP-intent interface is an interface mainly focusing on an end-to-end network management, and the NOP-intent interface is an interface mainly focusing on management of a subnetwork or a network device in each domain. In addition, for different scenarios corresponding to a same type of intent (for example, the NOP intent may include cell rehoming and regional load balancing scenarios), designed management interfaces and operations are also different.

According to a current principle for defining a management interface, different management interfaces are defined for different intent management scenarios. With the increase of services and the diversity of the services, an intent management interface is provided each time an intent management scenario is provided. Numerous intent management interfaces cause poor architecture flexibility and evolvability.

SUMMARY

Embodiments of this application provide an intent processing method and apparatus, to improve architecture flexibility and evolvability.

To achieve the foregoing objective, the following technical solutions are used in the embodiments of this application:

According to a first aspect, an intent processing method is provided, applied to a management device. An intent-driven management service (IDMS) interface is configured for the management device. The method may include: The management device receives an intent from a requirement device through the IDMS interface, where the intent includes information about an intent object, information about an intent action, and information about an intent-specific parameter, and the intent is used to indicate the management device to perform, on an object indicated by the information about the intent object, an action indicated by the information about the intent action. The management device obtains a configuration parameter based on the received intent. The management device configures, based on the obtained configuration parameter, a network or a service managed by the management device.

According to the intent processing method provided in this application, a universal IDMS interface is configured for the management device. Based on the interface, different intent models may be configured based on management scenarios. The requirement device proposes intents based on the intent models, to transfer and process the intents in the different management scenarios. Even if services increase and the services are diversified, only an intent model needs to be added. This improves architecture flexibility and evolvability.

The management device is configured to manage a network used by the requirement device or a service performed by the requirement device. In a process of using the network or performing the service, the requirement device proposes an intent based on a requirement, and the management device processes the intent, to manage the network used by the requirement device or the service performed by the requirement device. In different management scenarios on an actual communications network, the management device and the requirement device play different roles. For example, the requirement device is a CSC device, the management device is a CSP device, and the requirement device proposes an intent of a CSC type to the management device. For another example, the requirement device is a CSP device, the management device is a NOP device, and the requirement device proposes an intent of a CSP type to the management device. For another example, the requirement device is a NOP device, the management device is an NEP device, and the requirement device proposes an intent of a NOP type to the management device.

With reference to the first aspect, in a possible implementation, the IDMS interface is used to configure an intent model and transfer the intent model.

With reference to any one of the first aspect or the foregoing possible implementations, in a possible implementation, the intent model may include the intent object, the intent action, and the intent-specific parameter. It should be understood that the intent model may be understood as an intent template, and the requirement device may determine the intent based on content of the intent model.

With reference to any one of the first aspect or the foregoing possible implementations, in a possible implementation, the intent model may further include an allowed value of the intent object, an allowed value of the intent action, and an allowed value of the intent-specific parameter. The requirement device may select from the allowed values to determine the intent.

With reference to any one of the first aspect or the foregoing possible implementations, in a possible implementation, the intent processing method provided in this application may further include: The management device determines whether the received intent can be satisfied (satisfied). That the management device configures, based on the configuration parameter, a network or a service may be specifically implemented as follows: If the intent can be satisfied, the management device configures the network or the service based on the configuration parameter. In this implementation, the intent is processed only when the intent can be satisfied, so that processing efficiency is improved.

Whether the intent can be satisfied may be understood as whether the intent can be implemented, or may be understood as whether the management device supports execution of the intent.

With reference to any one of the first aspect or the foregoing possible implementations, in a possible implementation, the intent processing method provided in this application may further include: If the intent cannot be satisfied, the management device sends a first notification message to the requirement device, where the first notification message is used to indicate that the intent proposed by the requirement device cannot be satisfied. The first notification message may include one or more of the following content: an identifier (identity, ID) of the intent and cause information about why the intent cannot be satisfied.

With reference to any one of the first aspect or the foregoing possible implementations, in a possible implementation, the intent sent by the requirement device may carry the ID of the intent, or the management device allocates the ID to the intent when receiving the intent.

With reference to any one of the first aspect or the foregoing possible implementations, in a possible implementation, the intent processing method provided in this application may further include: The management device receives a priority of the intent from the requirement device. That the management device determines whether the intent can be satisfied may be specifically implemented as follows: The management device determines whether the intent conflicts with an intent being executed. If the intent conflicts with the intent being executed, and a priority of the intent is higher than a priority of the intent being executed, the intent can be satisfied. If the intent conflicts with the intent being executed, and a priority of the intent is equal to or lower than a priority of the intent being executed, the intent cannot be satisfied. If the intent does not conflict with the intent being executed, the intent can be satisfied.

With reference to any one of the first aspect or the foregoing possible implementations, in a possible implementation, that the management device determines whether the intent can be satisfied may be implemented as follows: The management device determines whether a quantity of available network or service resources is greater than or equal to a quantity of resources required for implementing the intent. If the quantity of the available network or service resources is greater than or equal to the quantity of the resources required for implementing the intent, the intent can be satisfied. If the quantity of the available network or service resources is less than the quantity of the resources required for implementing the intent, the intent cannot be satisfied.

The management device stores information about the available network or service resources, and the information is used to indicate the available network or service resources, and the quantity of the available network or service resources may be learned of by using the information. The management device further configures quantities of resources required for implementing different intents. When receiving the intent, the management device may obtain, based on configuration content, the quantity of the resources required for implementing the received intent.

With reference to any one of the first aspect or the foregoing possible implementations, in a possible implementation, whether the intent can be satisfied may be determined with reference to a quantity of resources and the priority of the intent. That the management device determines whether the intent can be satisfied may be implemented as follows: If the quantity of the available network or service resources is greater than or equal to the quantity of the resources required for implementing the intent, and the intent does not conflict with the intent being executed, the intent can be satisfied. If the quantity of the available network or service resources is greater than or equal to the quantity of the resources required for implementing the intent, the intent conflicts with the intent being executed, and the priority of the intent is higher than the priority of the intent being executed, the intent can be satisfied. If the intent conflicts with the intent being executed, and the priority of the intent is equal to or lower than the priority of the intent being executed, the intent cannot be satisfied. If the quantity of the available network or service resources is less than the quantity of the resources required for implementing the intent, the intent cannot be satisfied.

With reference to any one of the first aspect or the foregoing possible implementations, in a possible implementation, after the management device configures the network or the service based on the configuration parameter, the intent processing method provided in this application may further include: sending a second notification message to the requirement device, where the second notification message is used to indicate that the intent proposed by the requirement device has been executed. The second notification message includes the ID of the intent proposed by the requirement device.

With reference to any one of the first aspect or the foregoing possible implementations, in a possible implementation, the intent processing method provided in this application may further include: receiving, through the IDMS interface, an intent model configured by an administrator. The administrator may configure one intent model for each management scenario. Each intent model includes an intent object, an intent action, and an intent-specific parameter in the management scenario.

With reference to any one of the first aspect or the foregoing possible implementations, in a possible implementation, the intent processing method provided in this application may further include: sending the intent model to the requirement device through the IDMS interface.

With reference to any one of the first aspect or the foregoing possible implementations, in a possible implementation, that the management device sends the intent model to the requirement device may include: The management device sends an intent model supported by the management device to the requirement device.

With reference to any one of the first aspect or the foregoing possible implementations, in a possible implementation, the intent processing method provided in this application may further include: receiving an intent query request from the requirement device. Correspondingly, that the management device sends the intent model to the requirement device may include: The management device sends the intent model supported by the management device to the requirement device.

With reference to any one of the first aspect or the foregoing possible implementations, in a possible implementation, the intent processing method provided in this application may further include: receiving the intent query request from the requirement device, where the intent query request includes intent model requirement information. Correspondingly, that the management device sends the intent model to the requirement device may include: The management device sends, to the requirement device, an intent model indicated by the intent model requirement information.

In a possible implementation, the intent model requirement information may be type information, and the intent model requirement information is used to indicate a type of the intent model required by the requirement device.

The type information is used to indicate a type of the intent. Optionally, the type may be determined by a role of the requirement device in network or service management. The type information included in the intent query request sent by the requirement device is a type of an intent proposed by the role of the requirement device in the network or service management. The type information may also be used to indicate the type of the intent model, and an intent model of a type of intent is referred to as an intent template of the type. For example, the type of the intent may include a CSC, a CSP, and a NOP.

With reference to any one of the first aspect or the foregoing possible implementations, in a possible implementation, the information about the intent object may include at least one of the following content: end user, end user group, tenant, network, network slice, subnetwork, non-public network (non-public network), cell, network element, network function, service, or location area. The information about the intent action may include at least one of the following content: add, remove, provisioning, allocate, optimization, load balance, cell instant update, frequency update, cell instant delete, or physical cell update. The information about the intent-specific parameter may include at least one of the following content service type, user-perceived rate, location area, service duration period, service/slice type, maximum number of users, coverage area, area information, frequency channel number information, physical cell identifier list, edge user rate percentage, average user rate, source base station information, or destination base station information.

According to a second aspect, an intent processing method is provided, applied to a requirement device. The method may include: obtaining, through an IDMS interface of a management device, an intent model required by the requirement device from the management device, where the intent model includes an intent object, an intent action, and an intent-specific parameter; determining an intent based on the intent model, where the intent includes information about the intent object, information about the intent action, and information about the intent-specific parameter, and the intent is used to indicate the management device to perform, on an object indicated by the information about the intent object, an action indicated by the information about the intent action; and sending the determined intent to the management device through the IDMS interface.

According to the intent processing method provided in this application, the requirement device proposes the intent based on the intent model, to transfer and process the intent in different management scenarios. Even if services increase and the services are diversified, only an intent model needs to be added. This improves architecture flexibility and evolvability.

The intent model required by the requirement device may be an intent model of a type of the intent proposed by a role of the requirement device in the network or service management.

It should be noted that the intent model, the management device, the requirement device, and the like have been described in detail in the first aspect. Refer to the foregoing detailed content. Details are not described herein again.

With reference to the second aspect, in a possible implementation, the obtaining an intent model required by the requirement device from the management device may include: sending an intent query request to the management device, where the intent query request includes intent model requirement information, and the intent model requirement information is used to indicate the intent model required by the requirement device; and receiving the intent model indicated by the intent model requirement information from the management device.

In a possible implementation, the intent model requirement information may be type information, and the intent model requirement information is used to indicate a type of the intent model required by the requirement device.

The type information is used to indicate a type of the intent. Optionally, the type may be determined by a role of the requirement device in network or service management. The type information included in the intent query request sent by the requirement device is a type of the intent proposed by the role of the requirement device in the network. The type information may also be used to indicate the type of the intent model, and an intent model of a type of intent is referred to as an intent template of the type. For example, the type of the intent may include a CSC, a CSP, and a NOP.

With reference to any one of the second aspect or the foregoing possible implementations, in another possible implementation, the obtaining an intent model required by the requirement device from the management device may include: receiving an intent model supported by the management device from the management device; and selecting the intent model required by the requirement device from the intent model supported by the management device.

With reference to any one of the second aspect or the foregoing possible implementations, in another possible implementation, the obtaining an intent model required by the requirement device from the management device may include: sending an intent query request to the management device; receiving an intent model supported by the management device from the management device; and selecting the intent model required by the requirement device from the intent model supported by the management device.

With reference to any one of the second aspect or the foregoing possible implementations, in another possible implementation, the intent processing method provided in this application may include: The requirement device receives a first notification message sent by the management device, where the first notification message is used to indicate that the intent cannot be satisfied. The first notification message includes one or more of the following content: an ID of the intent indicated by intent information, and cause information about why the intent cannot be satisfied.

With reference to any one of the second aspect or the foregoing possible implementations, in a possible implementation, the intent sent by the requirement device may carry the ID of the intent, or the management device allocates the ID to the intent when receiving the intent.

With reference to any one of the second aspect or the foregoing possible implementations, in another possible implementation, the intent processing method provided in this application may include: The requirement device receives a second notification message sent by the management device, where the second notification message is used to indicate that the intent proposed by the requirement device has been executed. The second notification message includes the ID of the intent proposed by the requirement device.

According to a third aspect, an intent processing method is provided. The method may include: A requirement device obtains, through an IDMS interface of a management device, an intent model required by the requirement device from the management device, where the intent model includes an intent object, an intent action, and an intent-specific parameter. The requirement device determines an intent based on the intent model, where the intent includes information about the intent object, information about the intent action, and information about the intent-specific parameter, and the intent is used to indicate the management device to perform, on an object indicated by the information about the intent object, an action indicated by the information about the intent action. The requirement device sends the determined intent to the management device through the IDMS interface. The management device receives the intent from the requirement device through the IDMS interface, and obtains a configuration parameter based on the received intent. The management device configures, based on the obtained configuration parameter, a network or a service managed by the management device.

According to the intent processing method provided in this application, a universal IDMS interface is configured for the management device. Based on the interface, different intent models may be configured based on management scenarios. The requirement device proposes intents based on the intent models, to transfer and process the intents in the different management scenarios. Even if services increase and the services are diversified, only an intent model needs to be added. This improves architecture flexibility and evolvability.

It should be noted that, for specific implementation of the intent processing method provided in the third aspect, refer to specific implementation of any one of the first aspect or the possible implementations of the first aspect, and any one of the second aspect or the possible implementations of the second aspect. Details are not described herein again.

According to a fourth aspect, an intent processing apparatus is provided. An IDMS interface is configured for the apparatus. The apparatus may include a receiving unit, an obtaining unit, and a configuration unit. The receiving unit is configured to receive an intent from a requirement device through the IDMS interface, where the intent includes information about an intent object, information about an intent action, and information about an intent-specific parameter, and the intent is used to indicate the management device to perform, on an object indicated by the information about the intent object, an action indicated by the information about the intent action. The obtaining unit is configured to obtain a configuration parameter based on the received intent. The configuration unit is configured to configure, based on the configuration parameter obtained by the obtaining unit, a network or a service managed by the apparatus.

According to the intent processing apparatus provided in this application, a universal IDMS interface is configured. Based on the interface, different intent models may be configured based on management scenarios. The requirement device proposes intents based on the intent models, to transfer and process the intents in the different management scenarios. Even if services increase and the services are diversified, only an intent model needs to be added. This improves architecture flexibility and evolvability.

It should be noted that the intent processing apparatus provided in the fourth aspect of this application is configured to implement the intent processing method provided in any one of the first aspect or the possible implementations of the first aspect. Therefore, for specific implementation of the intent processing apparatus provided in the fourth aspect of this application, refer to specific implementation of the intent processing method provided in any one of the first aspect or the possible implementations of the first aspect. Details are not described herein again.

According to a fifth aspect, an intent processing apparatus is provided. The apparatus may include an obtaining unit, a determining unit, and a processing unit. The obtaining unit obtains, through an IDMS interface of a management device, an intent model required by the intent processing apparatus from the management device, where the intent model includes an intent object, an intent action, and an intent-specific parameter. The determining unit is configured to determine an intent based on the intent model, where the intent includes information about the intent object, information about the intent action, and information about the intent-specific parameter, and the intent is used to indicate the management device to perform, on an object indicated by the information about the intent object, an action indicated by the information about the intent action. The sending unit is configured to send the intent determined by the determining unit to the management device through the IDMS interface of the management device.

The intent processing apparatus provided in this application proposes the intent based on the intent model, to transfer and process the intent in different management scenarios. Even if services increase and the services are diversified, only an intent model needs to be added. This improves architecture flexibility and evolvability.

It should be noted that the intent processing apparatus provided in the fifth aspect of this application is configured to implement the intent processing method provided in any one of the second aspect or the possible implementations of the second aspect. Therefore, for specific implementation of the intent processing apparatus provided in the fifth aspect of this application, refer to specific implementation of the intent processing method provided in any one of the second aspect or the possible implementations of the second aspect. Details are not described herein again.

According to a sixth aspect, this application provides an intent processing apparatus. The intent processing apparatus may implement functions of the management device in the foregoing method example. The functions may be implemented by hardware, or may be implemented by hardware executing corresponding software. The hardware or the software includes one or more modules corresponding to the foregoing functions. The intent processing apparatus may exist in a product form of a chip.

With reference to the sixth aspect, in a possible implementation, a structure of the intent processing apparatus includes a processor and a transceiver, and the processor is configured to support the intent processing apparatus in performing corresponding functions in the foregoing method. The transceiver is configured to support communication between the intent processing apparatus and another device. The intent processing apparatus may further include a memory. The memory is configured to be coupled to the processor and stores program instructions and data that are necessary for the intent processing apparatus.

According to a seventh aspect, this application provides another intent processing apparatus. The intent processing apparatus may implement functions of the requirement device in the foregoing method example. The functions may be implemented by hardware, or may be implemented by hardware executing corresponding software. The hardware or the software includes one or more modules corresponding to the foregoing functions. The intent processing apparatus may exist in a product form of a chip.

With reference to the seventh aspect, in a possible implementation, a structure of the intent processing apparatus includes a processor and a transceiver, and the processor is configured to support the intent processing apparatus in performing corresponding functions in the foregoing method. The transceiver is configured to support communication between the intent processing apparatus and another device. The intent processing apparatus may further include a memory. The memory is configured to be coupled to the processor and stores program instructions and data that are necessary for the intent processing apparatus.

According to an eighth aspect, a management device is provided. The management device includes an intent processing apparatus that performs the intent processing method provided in any one of the first aspect or the possible implementations of the first aspect.

According to a ninth aspect, a requirement device is provided. The requirement device includes an intent processing apparatus that performs the intent processing method provided in any one of the second aspect or the possible implementations of the second aspect.

According to a tenth aspect, an intent processing system is provided, and includes the management device provided in the seventh aspect and the requirement device provided in the eighth aspect.

According to an eleventh aspect, another intent processing system is provided. The system includes a management device and a requirement device, and an IDMS interface is configured for the management device. The requirement device is configured to: obtain, through the IDMS interface of the management device, an intent model required by the requirement device from the management device, where the intent model includes an intent object, an intent action, and an intent-specific parameter; determine an intent based on the intent model, where the intent includes information about the intent object, information about the intent action, and information about the intent-specific parameter, and the intent is used to indicate the management device to perform, on an object indicated by the information about the intent object, an action indicated by the information about the intent action; and send the determined intent to the management device through the IDMS interface. The management device is configured to: receive the intent from the requirement device through the IDMS interface; obtain a configuration parameter based on the received intent; and configure, based on the configuration parameter, a network or a service managed by the management device.

According to a twelfth aspect, a computer-readable storage medium including instructions is provided. When the instructions are run on a computer, the computer is enabled to perform the intent processing method provided in any one of the foregoing aspects or the possible implementations.

According to a thirteenth aspect, a computer program product including instructions is provided. When the computer program product runs on a computer, the computer is enabled to perform the intent processing method provided in any one of the foregoing aspects or the possible implementations.

It should be noted that various possible implementations of any one of the foregoing aspects may be combined provided that the solutions are not contradictory.

DESCRIPTION OF EMBODIMENTS

The following describes technical solutions in embodiments of this application with reference to accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of the items, including any combination of one item (piece) or a plurality of items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. Persons skilled in the art may understand that the terms such as "first" and "second" do not constitute a limitation on a quantity or an execution sequence, and that the terms such as "first" and "second" do not indicate a definite difference.

Before specific solutions of this application are described, terms involved in this application are first described herein.

Requirement device: The requirement device may also be referred to as a consumer, and is a device that uses a network or a service. The requirement device may propose an intent based on a requirement of the requirement device, to configure the network or the service used by the requirement device.

Network provider device: The network provider device may also be referred to as a provider, and is a device that provides a network or a service.

Management device: The Management device is a device configured to manage, based on the intent proposed by the requirement device, the network or the service used by the requirement device. The management device may be separately deployed and independent of the network provider device, or may be deployed in the network provider device. This is not specifically limited in this embodiment of this application.

It should be noted that the foregoing devices may be functional units, may be chip systems, or other devices. This is not specifically limited in the embodiments of this application.

Figure 1:
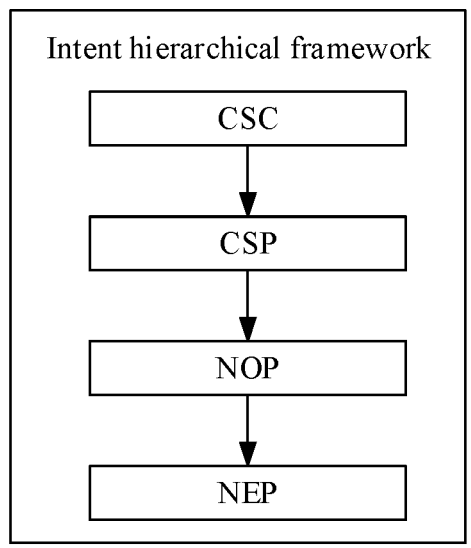
FIG. 1 is a schematic structural diagram of an intent hierarchical framework according to the conventional technology.

An intent processing method provided in the embodiments of this application is applied to an intent hierarchical framework shown in FIG. 1. As shown in FIG. 1, the intent hierarchical framework includes a CSC, a CSP, a NOP, and a network element provider (NEP).

The CSC can be an operating system of a vertical industry and mainly focuses on providing communication services for end users. The CSP provides communication services for the CSC, is responsible for operation of the communication services, including life cycle management of the communication services, and converts corresponding communication service requirements into network requirements. The NOP provides a network for the CSP, including slicing and non-slicing networks, and is responsible for life cycle management of the network. The NEP provides a network device for the NOP, and is responsible for life cycle management of a subnetwork and life cycle management and the like of a network element.

In the intent hierarchical framework shown in FIG. 1, the CSC, the CSP, and the NOP serve as a requirement device, and may also be referred to as a network consumer which may propose an intent based on a requirement of the consumer. After the intent is processed, a network used by the consumer or a service performed by the consumer is managed. Optionally, the intent proposed by the consumer is processed by a management device. The management device may be a management system of a provider, or may be the provider. This is not specifically limited in this application. It is uniformly described in this application that the consumer proposes the intent to the provider, but the intent is not limited to being processed by the provider.

For example, the CSC may send a CSC intent to the CSP, the CSP may send a CSP intent to the NOP, and the NOP may send a NOP intent to the NEP.

Specifically, units included in the intent hierarchical framework shown in FIG. 1 are distinguished between each other based on roles in communication. In an actual network architecture, in the intent hierarchical framework shown in FIG. 1, the CSC, the CSP, the NOP, and the NEP may be carried by different network elements.

Figure 2:
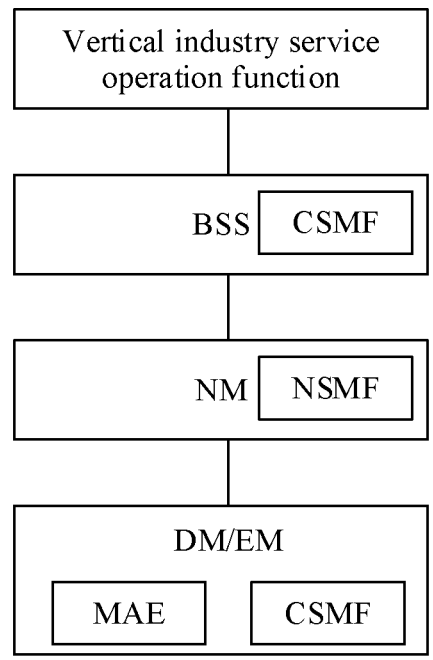
FIG. 2 is a schematic architectural diagram of a fifth generation mobile communications (5th-generation, 5G) management system according to an embodiment of this application.
Figure 2A:
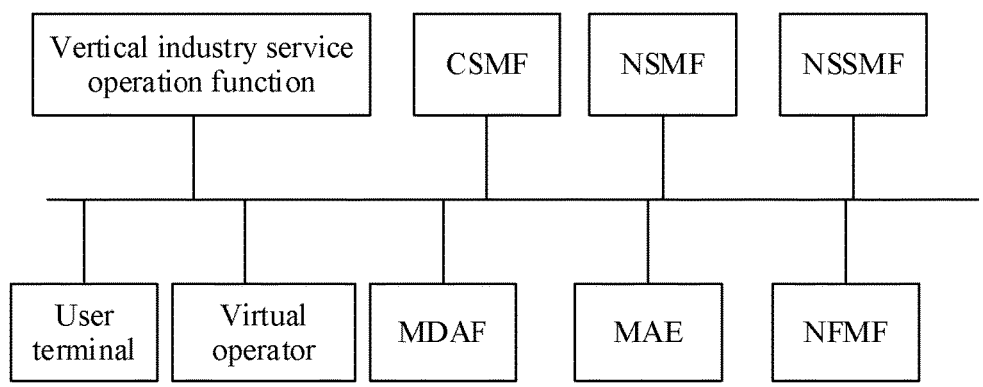
FIG. 2a is a schematic architectural diagram of another 5G management system according to an embodiment of this application.

For example, a role of the NEP may be carried by any one of the following units in a 5G management system shown in FIG. 2 or FIG. 2a: an element management (element manager, EM) unit, a mobile broadband (MBB) automation engine (MAE), a management data analytic function module (MDAF), or a network slice subnetwork management unit (NSSMF).

For example, a role of the NOP may be carried by any one of the following units in the 5G management system shown in FIG. 2 or FIG. 2a: a network slice management unit (NSMF), a network slice subnet management unit (NSSMF), or a network management unit (NM).

For example, a role of the CSP may be carried by any one of the following units in the 5G management system shown in FIG. 2 or FIG. 2a: a communication service management unit (CSMF) or a business support system (BSS).

For example, a role of the CSC may be carried by any one of the following units in the 5G management system shown in FIG. 2 or FIG. 2a: a user terminal, a vertical industry service operation function, a virtual operator, or the like.

It should be noted that FIG. 2 and FIG. 2a are merely examples used to describe an architecture of the 5G management system, but are not specifically used to limit the architecture of the 5G management system.

Optionally, the management device or the requirement device for performing the intent processing method provided in this application may be implemented by one device, or may be jointly implemented by a plurality of devices, or may be implemented by a functional module in a device, or may be implemented by a chip in a device. This is not specifically limited in the embodiments of this application. It may be understood that the foregoing functions may be network elements in a hardware device, or may be software functions running on dedicated hardware, or may be virtualization functions instantiated on a platform (for example, a cloud platform).

Figure 3:
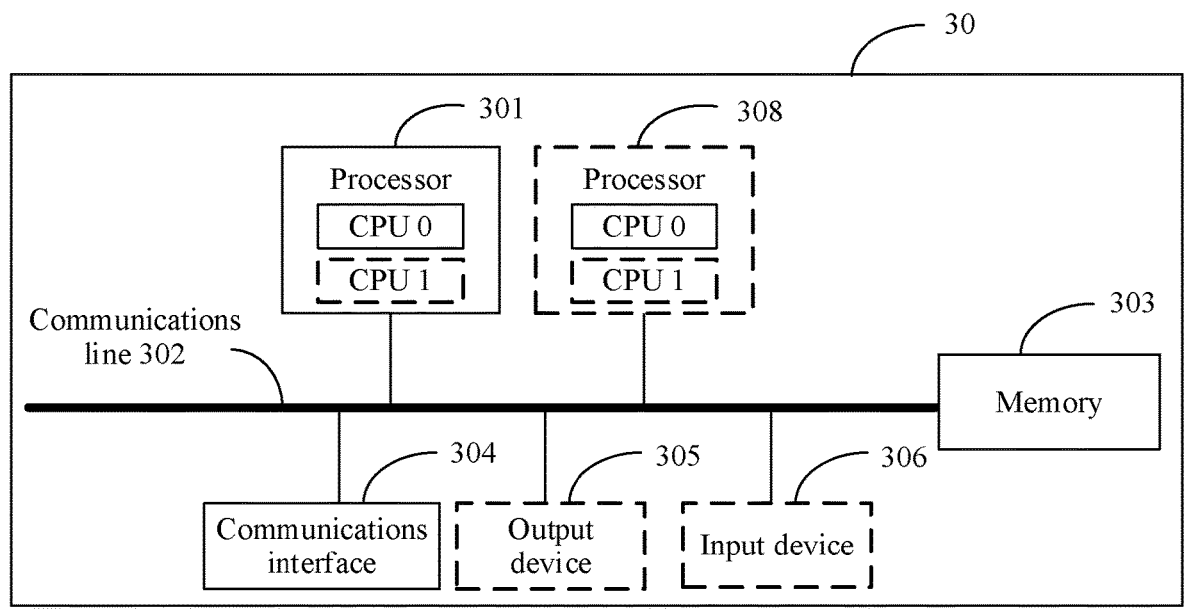
FIG. 3 is a schematic structural diagram of a communications apparatus according to an embodiment of this application.

For example, the management device or the requirement device for performing the intent processing method provided in this application may be implemented by using a communications apparatus 30 in FIG. 3. FIG. 3 is a schematic structural diagram of hardware of a communications apparatus 30 according to an embodiment of this application. The communications apparatus 30 includes a processor 301, a communications line 302, a memory 303, and at least one communications interface (descriptions are provided in FIG. 3 merely by using an example in which the communications apparatus 30 includes a communications interface 304).

The processor 301 may be a general-purpose central processing unit (central processing unit, CPU), a microprocessor, an application-specific integrated circuit (application-specific integrated circuit, ASIC), or one or more integrated circuits configured to control program execution of the solutions of this application.

The communications line 302 may include a path for transmitting information between the foregoing components.

The communications interface 304 is applicable to any apparatus such as a transceiver, and is configured to communicate with another device or a communication network such as the Ethernet, a radio access network (RAN), or a wireless local area network (WLAN).

The memory 303 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and be connected to the processor through the communications line 302. The memory may be alternatively integrated with the processor.

The memory 303 is configured to store computer-executable instructions for executing the solutions of this application, and the processor 301 controls execution of the computer-executable instructions. The processor 301 is configured to execute the computer-executable instructions stored in the memory 303, to implement the intent processing method provided in the following embodiments of this application.

Optionally, the computer-executable instructions in this embodiment of this application may also be referred to as application program code. This is not specifically limited in this embodiment of this application.

During specific implementation, in an embodiment, the processor 301 may include one or more CPUs, for example, a CPU 0 and a CPU 1 in FIG. 3.

During specific implementation, in an embodiment, the communications apparatus 30 may include a plurality of processors, for example, the processor 301 and a processor 308 in FIG. 3. Each of these processors may be a single-core processor (single-CPU), or may be a multi-core processor (multi-CPU). The processor herein may refer to one or more devices, circuits, and/or processing cores configured to process data (for example, computer program instructions).

During specific implementation, in an embodiment, the communications apparatus 30 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive an input of a user in a plurality of manners. For example, the input device 306 may be a mouse, a keyboard, a touchscreen device, or a sensing device.

The foregoing communications apparatus 30 may be a general-purpose device or a dedicated device. During specific implementation, the communications apparatus 30 may be a desktop computer, a portable computer, a network server, a palmtop computer (personal digital assistant, PDA), a mobile phone, a tablet computer, a wireless terminal device, an embedded device, or a device having a similar structure in FIG. 3. A type of the communications apparatus 30 is not limited in this embodiment of this application.

In a possible implementation, when the communications apparatus 30 is used as the management device for performing the intent processing method provided in this application, an IDMS interface is configured for the communications apparatus 30, and the processor 301 runs or executes the software program and/or the module stored in the memory 303, and invokes the data stored in the memory 303 to perform the following functions:

receiving an intent from a requirement device through the IDMS interface, where the intent includes information about an intent object, information about an intent action, and information about an intent-specific parameter, and the intent is used to indicate the management device to perform, on an object indicated by the information about the intent object, an action indicated by the information about the intent action; obtaining a configuration parameter based on the received intent; and configuring, based on the obtained configuration parameter, a network or a service managed by the management device.

In a possible implementation, when the communications apparatus 30 is used as a requirement device for performing the intent processing method provided in this application, the processor 301 runs or executes the software program and/or the module stored in the memory 303, and invokes the data stored in the memory 303, to perform the following function:

obtaining, through an IDMS interface of a management device, an intent model required by the communications apparatus 30 from the management device, where the intent model includes an intent object, an intent action, and an intent-specific parameter; determining an intent based on the intent model, where the intent includes information about the intent object, information about the intent action, and information about the intent-specific parameter, and the intent is used to indicate the management device to perform, on an object indicated by the information about the intent object, an action indicated by the information about the intent action; and sending the determined intent to the management device through the IDMS interface.

The following describes in detail the solutions provided in the embodiments of this application with reference to accompanying drawings.

It should be noted that, in the following embodiments of this application, names of messages or names of parameters in messages between devices are merely examples, and the messages or the parameters may have other names in specific implementation. This is not specifically limited in the embodiments of this application.

According to one aspect, an embodiment of this application provides an intent processing method, used in the intent hierarchical framework shown in FIG. 1 in which a requirement device proposes an intent to a management device, and the management device processes the intent. The requirement device may be the CSC, the CSP, and the NOP in the intent hierarchical framework shown in FIG. 1, and correspondingly, the management device may be the CSP, the NOP, and the NEP in the intent hierarchical framework shown in FIG. 1. The following describes in detail the intent processing method provided in this application with reference to the accompanying drawings.

Figure 4A:
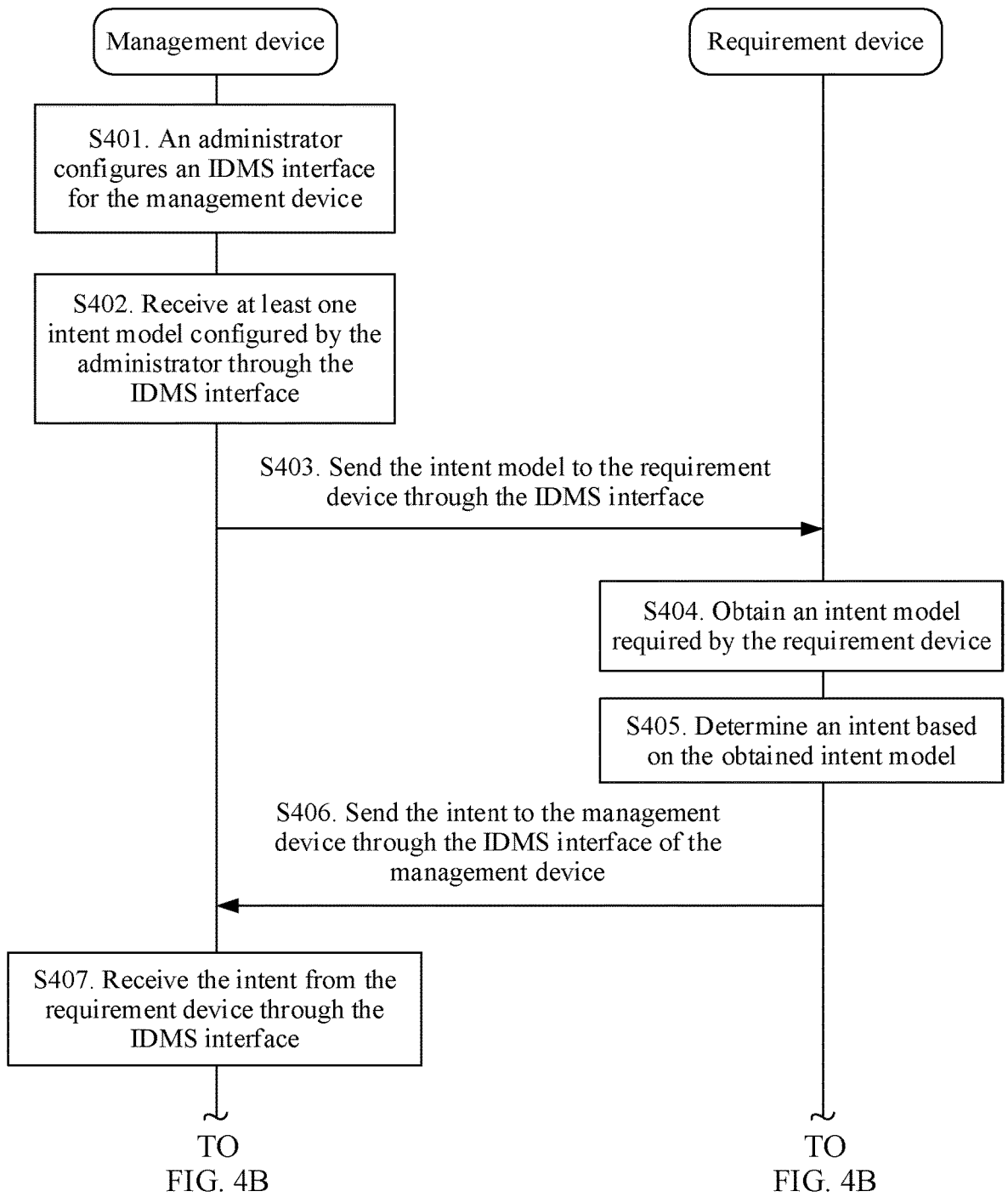
FIG. 4A and FIG. 4B are a schematic flowchart of an intent processing method according to an embodiment of this application.
Figure 4B:
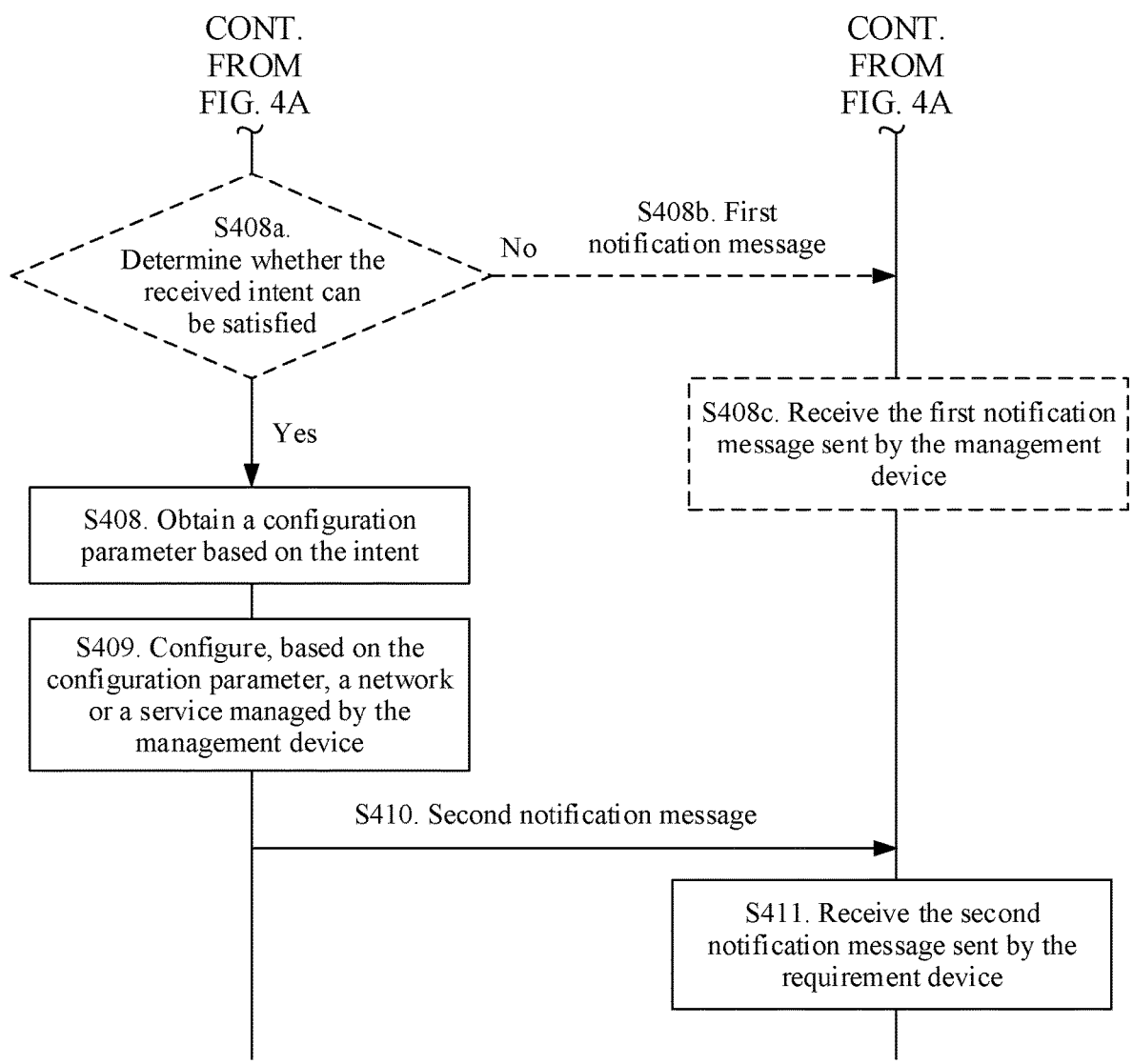

As shown in FIG. 4A and FIG. 4B, the intent processing method provided in this application may include the following steps.

S401. An administrator configures an IDMS interface for a management device.

The IDMS interface is a general-purpose interface, and the IDMS interface has at least the following two functions:

First, the IDMS interface is configured to obtain an intent, to be specific, a requirement device communicates with the management device through the IDMS interface, and proposes the intent to the management device.

Second, the IDMS interface is further configured to receive an intent model configured by the administrator for different intent management scenarios, where the intent model includes an intent object, an intent action, and an intent-specific parameter.

It should be understood that the intent model may be understood as an intent template, and the requirement device may determine the intent based on content of the intent model. The requirement device proposes the intent based on the intent model by providing information about the intent object, information about the intent action, and information about the intent-specific parameter. The intent is used to indicate the management device to perform, on an object indicated by the information about the intent object, an action indicated by the information about the intent action.

The intent object is used to describe an object on which the intent acts, the intent action is used to describe a specific action expected to be implemented on the object of the intent, and the intent action-specific parameter is used to describe a parameter specified for the action that implements the intent. The information about the intent object is used to indicate the object, the information about the intent action is used to indicate the action, and the information about the intent-specific parameter is used to indicate the parameter. Forms and content of various types of information are not specifically limited in this application.

For example, an intent may be expressed by using the intent object (Object), the intent action (Action), and the intent action-specific parameter, and is used to indicate to perform the intent action on the intent object.

In a possible implementation, the intent model may further include an allowed value of the intent object, an allowed value of the intent action, and an allowed value of the intent-specific parameter. The requirement device may select a corresponding value from the allowed values to determine the intent.

In a possible implementation, the information about the intent object may include at least one of the following content: end user, end user group, tenant, network, network slice, subnetwork, non-public network (non-public network), cell, network element, network function, service, or location area. The information about the intent action may include at least one of the following content: add, remove, provisioning, allocate, optimization, load balance, cell instant update, frequency update, cell instant delete, or physical cell update. The information about the intent-specific parameter may include at least one of the following content: service type, user-perceived rate, location area, service duration period, service/slice type, maximum number of users, coverage area, area information, frequency channel number information, physical cell identifier list, edge user rate percentage, average user rate, source base station information, or destination base station information.

For example, for an intent model of a CSC intent, the allowed value of the object may include one or more of the following content: end user, end user group, or tenant tenant. The allowed value of the action may include one or more of the following content: add, remove, or provisioning. The allowed value of the action-specific information may be one or more of the following: service type (service type, for example, vehicle to everything (V2X), or voice), user-perceived rate, location area, and service duration period.

For example, for an intent model of a CSP intent, the allowed value of the object may include one or more of the following content: network, NSI (network slice), or non-public network. The allowed value of the action may include Allocate (allocate). The allowed value of the action-specific information may be one or more of the following content: service/slice type (for example, ultra-reliable low-latency communication (URLLC), massive internet of things (mIoT), and enhanced mobile broadband (eMBB)), max Number of UEs (maximum number of users), user-perceived rate, or CoverageArea.

For example, for an intent model of a NOP intent, the allowed value of the object may include one or more of the following content: cell, NE (network element, for example, a next generation nodeB (generation node B, gNB) or an evolved NodeB (evolved NodeB, eNB)), or subnetwork. The allowed value of the action may include one or more of the following content: optimization, create, allocate, Load-Balance (load balance), FreqUpdate (frequency update), physical cell identifier (PCI) update (PCI update), CellInstant Update (cell instant update), or Delete (delete). The allowed value of the action-specific information may be one or more of the following: service/slice type (service/slice type, such as URLLC, mIoT, and eMBB), max Number of UEs (maximum number of users), User experience data (user-perceived rate), CoverageArea (coverage area), AreaInformation (area information), and frequency channel number information (uplink/downlink absolute radio frequency channel number (UL/DL ARFCN)), PCI List (physical cell identifier list, including one or more physical cells), Percentage of user equipment (UE) with low throughput (edge user rate percentage), Average UE throughput (average user rate), source base station information, or destination base station information.

It should be noted that the foregoing examples are merely examples used to describe allowed values of content in the intent model, and do not constitute a specific limitation.

It should be noted that a configuration solution of the IDMS interface is not specifically limited in this embodiment of this application. Intent attributes can be configured based on an actual requirement.

S402. The management device receives at least one intent model that is configured by the administrator through the IDMS interface.

The administrator is an administrator of the management device, and may be a person of a vendor of the management device, or may be a person that uses the management device. This is not specifically limited in this embodiment of this application.

Specifically, in S402, the administrator may configure different intent models for different intent management scenarios.

S403. The management device sends the intent model to the requirement device through the IDMS interface.

Specifically, in S403, the management device may use the following two implementations, but is not limited to using the two implementations to send the intent model to the requirement device.

Implementation 1: The management device actively sends the intent model to the requirement device.

In the implementation 1, after being configured with the intent model, the management device sends an intent model supported by the management device to a requirement device that uses a network or a service managed by the management device.

Optionally, in the implementation 1, the management device may periodically send the intent model, or may send the intent model each time after the intent model is configured. This is not specifically limited in this embodiment of this application.

Implementation 2: The management device sends the intent model to the requirement device based on a request of the requirement device.

In the implementation 2, the intent processing method provided in this embodiment of this application may further include: The management device receives an intent query request from the requirement device.

In a possible implementation, the intent query request is used to request an intent model supported by the management device. Correspondingly, S403 may be specifically implemented as follows: The management device sends the intent model supported by the management device to the requirement device.

In another possible implementation, the intent query request includes intent model requirement information, and the intent query request is used to request an intent model indicated by the intent model requirement information. Correspondingly, S403 may be specifically implemented as follows: The management device sends, to the requirement device, the intent model indicated by the intent model requirement information.

In a possible implementation, the intent model requirement information may be type information, and the intent model requirement information is used to indicate a type of an intent model required by the requirement device.

The type information is used to indicate a type of the intent. Optionally, the type may be determined by a role of the requirement device in network or service management. The type information included in the intent query request sent by the requirement device is a type of an intent proposed by the role of the requirement device in the network or service management. The type information may also be used to indicate the type of the intent model, and an intent model of a type of intent is referred to as an intent template of the type. For example, the type of the intent may include a CSC, a CSP, and a NOP.

Optionally, the type information may be a character used to describe the type of the intent, or the type information may be a role type of the requirement device, or the type information may be an identifier of the requirement device.

S404. The requirement device obtains the intent model required by the requirement device from the management device.

The intent model required by the requirement device may be an intent model of the type of the intent proposed by the role of the requirement device in the network or service management.

For example, the requirement device may be a CSC. In this case, the intent model required by the requirement device is a CSC intent model. The requirement device may be a CSP. In this case, the intent model required by the requirement device is a CSP intent model. The requirement device may be a NOP. In this case, the intent model required by the requirement device is a NOP intent model. Certainly, there may be other types of intent models required by the requirement device, which are not shown one by one herein.

Corresponding to the implementation 1 in S403, S404 may be specifically implemented as follows: The requirement device receives the intent model supported by the management device from the management device. The requirement device selects the intent model required by the requirement device from the intent model supported by the management device.

Corresponding to the implementation 2 in S403, S404 may be specifically implemented as follows: The requirement device sends the intent query request to the management device. The requirement device receives the intent model supported by the management device from the management device. The requirement device selects the intent model required by the requirement device from the intent model supported by the management device.

Corresponding to the implementation 2 in S403, S404 may be specifically implemented as follows: The requirement device sends the intent query request to the management device, where the intent query request includes the intent model requirement information, and the intent model requirement information is used to indicate the intent model required by the requirement device. The requirement device receives the intent model indicated by the intent model requirement information from the management device.

It should be noted that the intent model requirement information has been described in detail in S403, and details are not described herein again.

For example, it is assumed that the requirement device is a CSC device, the requirement device may send an intent query request including a CSC field to the management device, to obtain the CSC intent model required by the requirement device.

S405. The requirement device determines the intent based on the obtained intent model.

The intent may include the information about the intent object, the information about the intent action, and the information about the intent-specific parameter. The intent is used to indicate the management device to perform, on the object indicated by the information about the intent object, the action indicated by the information about the intent action.

In a possible implementation, the information about the intent object, the information about the intent action, and the information about the intent-specific parameter that are included in the intent are input by the administrator of the requirement device or are derived by the requirement device based on other information (for example, service requirement information).

In a possible implementation, the intent model includes the allowed value of the intent object, the allowed value of the intent action, and the allowed value of the intent-specific parameter. The information about the intent object, the information about the intent action, and the information about the intent-specific parameter that are included in the intent are selected from the allowed values and input by the administrator of the requirement device, or selected from the allowed values and input by the requirement device based on other information (for example, service requirement information). In S405, the requirement device presents the intent model obtained in S404 to the administrator of the requirement device by using a display apparatus. The administrator of the requirement device selects an allowed value of the intent model for input by using an input apparatus of the requirement device based on an actual requirement. The requirement device may determine the intent based on content entered by the administrator.

In a possible implementation, the information about the intent object, the information about the intent action, and the information about the intent-specific parameter that are included in the intent are selected by the requirement device from the allowed values.

In a possible implementation, the intent may further include an ID of the intent. The ID of the intent is used to uniquely identify an intent. The requirement device may configure content of the ID of the intent based on an actual requirement, and include the content in the intent. This is not specifically limited in this embodiment of this application.

For example, it is assumed that the requirement device has a CSC intent of adding a voice service type of a location area A for an end user. After obtaining an intent model of a CSC type, the requirement device determines an intent 1. Information about an intent object included in the intent 1 is end user (End User), information about an intent action included in the intent 1 is add (Add), and information about an intent action-specific parameter included in the intent 1 is voice service type and location area A. The intent 1 is used to add the voice service type of the location area A for the end user.

For example, it is assumed that the requirement device has a CSP intent of allocating an eMBB service/slice type to a non-public network. After obtaining an intent model of a CSP type, the requirement device determines an intent 2. Information about an intent object included in the intent 2 is non-public network (non-public network), information about an intent action included in the intent 2 is allocate (allocate), and information about an intent action-specific parameter included in the intent 2 is service/slice type: eMBB. The intent 2 is used to allocate the eMBB service/slice type to the non-public network.

For example, it is assumed that the requirement device has a NOP intent of rehoming a cell. After obtaining an intent model of a NOP type, the requirement device determines an intent 3. Information about an intent object included in the intent 3 is Cell (cell), information about an intent action included in the intent 3 is rehome (rehome), information about an intent action-specific parameter included in the intent 3 is destination base station information. The intent 3 is used to rehome the cell to a destination base station.

For example, when the role of the requirement device in network or service management is the CSC, the requirement device may obtain the intent model of the CSC intent from the management device (CSP). The intent model includes the intent object, the intent action, and the intent-specific parameter. The requirement device determines the CSC intent based on the CSC intent model.

The information about the intent object included in the CSC intent may be one or more of the following content: End User (end user), End User Group (end user group), or tenant (tenant). The information about the intent action included in the CSC intent may be one or more of the following content: Add (add), Remove (remove), or Provisioning (provisioning). The information about the intent-specific parameter included in the CSC intent may be one or more of the following content: service type (service type, such as V2X and voice), User experience data (user-perceived rate), location area, or service duration period.

For example, when the role of the requirement device in the network or service management is the CSP, the requirement device may obtain the intent model of the CSP intent from the management device (NOP). The intent model includes the intent object, the intent action, and an the intent-specific parameter. The requirement device determines the CSP intent based on the CSP intent model.

The information about the intent object included in the CSP intent may be one or more of the following content: Network (network), NSI (network slice), or non-public network (non-public network). The information about the intent action included in the CSP intent may be Allocate (allocate). The information about the intent-specific parameter included in the CSP intent may be one or more of the following content: service/slice type (service/slice type, such as URLLC, mIoT, and eMBB), max Number of UEs (maximum number of users), User experience data (user-perceived rate), or Coverage Area (coverage area).

For example, when the role of the requirement device in the network or service management is the NOP, the requirement device may obtain the intent model of the NOP intent from the management device (NEP). The intent model includes the intent object, the intent action, and the intent-specific parameter. The requirement device determines the NOP intent based on the NOP intent model.

For example, the information about the intent object included in the NOP intent may be one or more of the following content: Cell (cell), NE (network element, such as a gNB or an eNB), or SubNetwork (subnetwork). The information about the intent action included in the NOP intent may be one or more of the following content: optimization, create, allocate, LoadBalance (load balance), FreqUpdate (frequency update), PCI update, and CellInstant Update (cell instant update), or delete. The information about the intent-specific parameter included in the NOP intent may be one or more of the following content: service/slice type (such as URLLC, mIoT, and eMBB), max Number of UEs (maximum number of users), user-perceived rate, CoverageArea (coverage area), AreaInformation (area information), frequency channel number information (UL/DL ARFCN), PCI List, Percentage of UE, Average UE throughput, source base station information, or destination base station information.

It should be noted that the foregoing examples are examples for description, and do not constitute a specific limitation.

S406. The requirement device sends the intent to the management device through the IDMS interface of the management device.

The intent sent in S406 is the intent determined by the requirement device in S405. Details are not described herein again.

In a possible implementation, in S406, the requirement device may send, to the management device, the intent by sending an intent delivery request (Intent Deliver request) that carries the intent.

In a possible implementation, in S406, when sending the intent, the requirement device further sends a priority of the intent to the management device.

The priority of the intent is configured by the requirement device based on an actual situation. A configuration process of the priority of the intent is not specifically limited in this application.

S407. The management device receives the intent from the requirement device through the IDMS interface.

The intent received in S407 is the intent sent by the requirement device in S406. Details are not described herein again.

S408. The management device obtains a configuration parameter based on the intent.

Specifically, S408 may be implemented in the following two solutions, but the two solutions do not impose a specific limitation on implementation of S408.

Solution 1: A correspondence between content of the intent and the configuration parameter is preset, and the configuration parameter may be obtained by querying the correspondence based on the content of the intent in S408. Content of the correspondence may be configured based on actual experience. The content of the correspondence is not specifically limited in this embodiment of this application.

For example, Table 1 shows a correspondence between content of an intent and a configuration parameter.

TABLE 1

| Intent content | Configuration parameter |
| --- | --- |
| Intent content X | Configuration parameter x |
| Intent content Y | Configuration parameter y |
| Intent content Z | Configuration parameter z |
| ... | ... |

It should be noted that Table 1 merely describes the correspondence between the content of the intent and the configuration parameter by using an example, but does not specifically limit content and a form of the correspondence between the content of the intent and the configuration parameter. During actual application, the content and the form of the correspondence between the content of the intent and the configuration parameter may be configured based on an actual requirement.

For example, for an intent of CellRehome, a preconfigured configuration parameter corresponding to the intent of CellRehome is: deleting a managed object of a source cell, creating a managed object of a cell served by a destination base station, copying a parameter of the managed object of the source cell, creating the managed object of the cell, and configuring relationships and external cells of corresponding neighboring cells served by a source base station and the destination base station. When receiving the intent of CellRehome, the management device only needs to perform S408 of obtaining the configuration parameter corresponding to the intent of CellRehome.

Solution 2: Import an intent conversion template in advance, and match the intent with a corresponding intent conversion template in S408, to obtain the configuration parameter through conversion.

A conversion rule of the intent and the configuration parameter is configured in the intent conversion template, and is used to convert the intent into the configuration parameter.

In a possible implementation, S409 is performed after S408.

In another possible implementation, as shown in FIG. 4A and FIG. 4B, the intent processing method provided in this embodiment of this application may further include S408a. A sequence of performing S408a and S408 is not limited, and S408a and S408 may be performed simultaneously or sequentially. When S408a and S408 are performed sequentially, the sequence may be configured based on an actual requirement. The sequence of performing S408a and S408 in FIG. 4A and FIG. 4B is merely an example, and does not constitute a specific limitation.

S408a. The management device determines whether the received intent can be satisfied.

Whether the intent can be satisfied may be understood as whether the intent can be implemented, or may be understood as whether the management device supports execution of the intent.

Specifically, a specific implementation solution of determining whether the received intent can be satisfied may be configured based on an actual requirement. This embodiment of this application provides the following three specific implementations of determining whether the received intent can be satisfied, but does not impose a specific limitation thereon.

In a possible implementation, in S408a, that the management device determines whether the received intent can be satisfied may be implemented as follows: The management device determines whether a quantity of available network or service resources is greater than or equal to a quantity of resources required for implementing the intent. If the quantity of the available network or service resources is greater than or equal to the quantity of the resources required for implementing the intent, the intent can be satisfied. If the quantity of the available network or service resources is less than the quantity of the resources required for implementing the intent, the intent cannot be satisfied.

The management device stores information about the available network or service resources, and the information is used to indicate the available network or service resources, and the quantity of the available network or service resources may be learned of by using the information. The management device further configures quantities of resources required for implementing different intents. When receiving the intent, the management device may obtain, based on configuration content, the quantity of the resources required for implementing the received intent.

For example, the configuration content may be a mapping relationship between the content of the intent and the quantity of resources required for implementing the intent, and the quantity of the resources required for implementing the received intent may be obtained by querying the mapping relationship.

In a possible implementation, in S408a, that the management device determines whether the received intent can be satisfied may be implemented as follows: The management device determines whether the intent conflicts with an intent being executed. If the intent conflicts with the intent being executed, and a priority of the intent is higher than a priority of the intent being executed, the intent can be satisfied. If the intent conflicts with the intent being executed, and a priority of the intent is equal to or lower than a priority of the intent being executed, the intent cannot be satisfied. If the intent does not conflict with the intent being executed, the intent can be satisfied.

When receiving the intent sent by the requirement device, the management device further receives the priority of the intent. Alternatively, when receiving the intent, the management device determines the priority of the intent according to a preset principle. The preset principle may be a correspondence or others. This is not specifically limited in this embodiment of this application.

In a possible implementation, whether the received intent can be satisfied is determined with reference to a quantity of resources and a priority. In S408a, that the management device determines whether the received intent can be satisfied may be implemented as follows: If the quantity of the available network or service resources is greater than or equal to the quantity of the resources required for implementing the intent, and the intent does not conflict with the intent being executed, the intent can be satisfied. If the quantity of the available network or service resources is greater than or equal to the quantity of the resources required for implementing the intent, the intent conflicts with the intent being executed, and the priority of the intent is higher than the priority of the intent being executed, the intent can be satisfied. If the intent conflicts with the intent being executed, and the priority of the intent is equal to or lower than the priority of the intent being executed, the intent cannot be satisfied. If the quantity of the available network or service resources is less than the quantity of the resources required for implementing the intent, the intent cannot be satisfied.

If it is determined in S408a that the received intent can be satisfied, S409 is performed after S408. If it is determined in S408a that the received intent cannot be satisfied, S408b and S408c are performed.

S408b. The management device sends a first notification message to the requirement device.

The first notification message is used to indicate that the intent proposed by the requirement device cannot be satisfied. The first notification message includes one or more of the following content: an ID of an intent that cannot be satisfied, and cause information about why the intent cannot be satisfied.

It should be noted that the first notification message may be a newly defined message, or may reuse an existing message in an existing network.

The ID of the intent may be an ID included in the intent, or may be a unique identifier allocated by the management device to the received intent. This is not specifically limited in this embodiment of this application.

In a possible implementation, the cause information is used to indicate a specific cause why the intent cannot be satisfied. The cause information may be a cause value, or the cause information may be unique identifiers allocated to different infeasible causes. This is not specifically limited in this embodiment of this application.

S408c. The requirement device receives the first notification message sent by the management device.

The requirement device determines, based on the first notification message received in S408c, that the proposed intent is not executed.

S409. The management device configures, based on the configuration parameter, the network or the service managed by the management device.

Specifically, in S409, the management device adjusts, based on the configuration parameter, the network or the service managed by the management device. This process is not described in detail in this application.

Specifically, that the management device configures, based on the configuration parameter, the network or the service managed by the management device may be: The management device configures, based on the configuration parameter, a managed object of the network or the service managed by the management device, where the managed object is used to carry configuration information of the network or the service.

S410. The management device sends a second notification message to the requirement device.

The second notification message is used to indicate that the intent proposed by the requirement device has been executed. The second notification message includes the ID of the intent proposed by the requirement device.

It should be noted that the second notification message may be a newly defined message, or may reuse an existing message in the existing network.

S411. The requirement device receives the second notification message sent by the requirement device.

The requirement device determines, based on the second notification message received in S408c, that the proposed intent has been executed.

It should be noted that an execution sequence of the foregoing steps included in the intent processing method provided in this embodiment of this application may be configured based on an actual requirement. This is not specifically limited in this application. FIG. 4A and FIG. 4B show only a possible execution sequence of the foregoing steps included in the intent processing method, and does not constitute a specific limitation.

According to the intent processing method provided in this application, a universal IDMS interface is configured for the management device. Based on the interface, different intent models may be configured based on management scenarios. The requirement device proposes intents based on the intent models, to transfer and process the intents in the different management scenarios. Even if services increase and the services are diversified, only an intent model needs to be added. This improves architecture flexibility and evolvability.

Further, a device vendor may also configure the intent model based on the universal IDMS interface, so that devices of different vendors can be easily integrated for intent processing.

The foregoing mainly describes the solutions provided in the embodiments of this application from a perspective of interaction between network elements. It may be understood that, to implement the foregoing functions, the management device and the requirement device include corresponding hardware structures and/or software modules for performing the functions. A functional unit that implements the foregoing intent processing method in the management device and the requirement device is referred to as an intent processing apparatus. Persons skilled in the art should be easily aware that units, algorithms, and steps in the examples described with reference to the embodiments disclosed in this specification can be implemented in a form of hardware or a combination of hardware and computer software in this application. Whether a specific function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In the embodiments of this application, the intent processing apparatus may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in the embodiments of this application, division into the modules is an example and is merely logical function division. During actual implementation, another division manner may be used.

Figure 5:
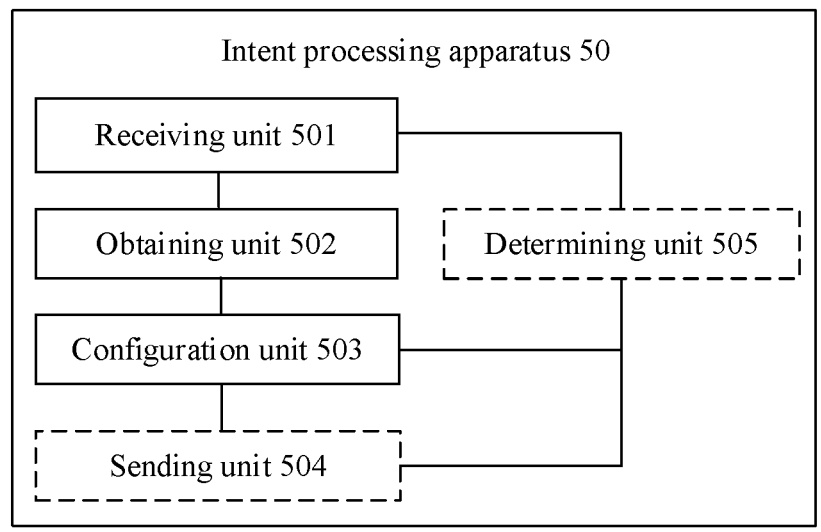
FIG. 5 is a schematic structural diagram of an intent processing apparatus according to an embodiment of this application.

When the functional modules are obtained through division based on the corresponding functions, FIG. 5 is a schematic diagram of a possible structure of an intent processing apparatus 50 deployed on the management device in the foregoing embodiments. The intent processing apparatus 50 may be a management device itself, or may be a functional module or a chip in the management device. An IDMS interface is configured for the intent processing apparatus 50. As shown in FIG. 5, the intent processing apparatus 50 may include a receiving unit 501, an obtaining unit 502, and a configuration unit 503. The receiving unit 501 is configured to perform the processes S402 and S407 in FIG. 4A and FIG. 4B. The obtaining unit 502 is configured to perform the process S408 in FIG. 4B. The configuration unit 503 is configured to perform the process S409 in FIG. 4B. All related content of the steps in the foregoing method embodiments may be cited in function descriptions of corresponding functional modules, and details are not described herein again.

Further, as shown in FIG. 5, the intent processing apparatus 50 may further include a sending unit 504 and a determining unit 505. The sending unit 504 is configured to perform the processes S403, S408, and S410 in FIG. 4A and FIG. 4B. The determining unit 505 is configured to perform the process S408a in FIG. 4B.

Figure 6:
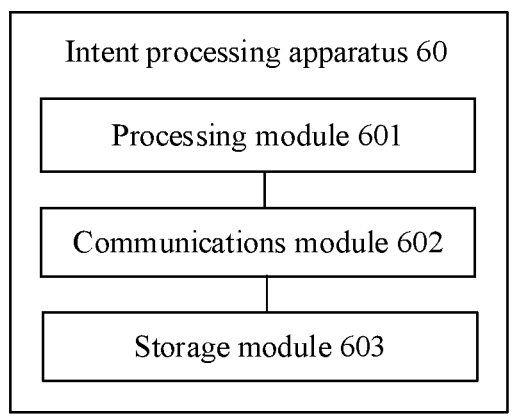
FIG. 6 is a schematic structural diagram of another intent processing apparatus according to an embodiment of this application.

When an integrated unit is used, FIG. 6 is a schematic diagram of a possible structure of an intent processing apparatus 60 deployed on the management device in the foregoing embodiments. The intent processing apparatus 60 may be a management device itself, or may be a functional module or a chip in the management device. An IDMS interface is configured for the intent processing apparatus 60. The intent processing apparatus 60 may include a processing module 601 and a communications module 602. The processing module 601 is configured to control and manage an action of the intent processing apparatus 60. For example, the processing module 601 is configured to perform the processes S408a, S408, and S409 in FIG. 4B. The processing module 601 is further configured to perform the processes S402, S403, S407, and S410 in FIG. 4A and FIG. 4B by using the communications module 602. The intent processing apparatus 60 may further include a storage module 603, configured to store program code and data of the intent processing apparatus 60.

The processing module 601 may be the processor 301 in a physical structure of the communications apparatus 30 shown in FIG. 3, and may be a processor or a controller. For example, the processing module 601 may be a CPU, a general-purpose processor, a DSP, an ASIC, an FPGA or another programmable logic device, a transistor logic device, a hardware component, or any combination thereof. The processing module 601 may implement or execute various example logical blocks, modules, and circuits described with reference to content disclosed in this application. Alternatively, the processor module 601 may be a combination of processors implementing a computing function, for example, a combination of one or more microprocessors, or a combination of the DSP and a microprocessor. The communications module 602 may be the communications interface 304 in the physical structure of the communications apparatus 30 shown in FIG. 3. The communications module 602 may be a communications port, or may be a transceiver, a transceiver circuit, a communications interface, or the like. Alternatively, the communications interface may communicate with another device by using the foregoing element that has a transceiver function. The foregoing element that has the transceiver function may be implemented by using an antenna and/or a radio frequency apparatus. The storage module 603 may be the memory 303 in the physical structure of the communications apparatus 30 shown in FIG. 3.

When the processing module 601 is a processor, the communications module 602 is a communications interface, and the storage module 603 is a memory, the intent processing apparatus 60 in FIG. 6 in this embodiment of this application may be the communications apparatus 30 shown in FIG. 3.

As described above, the intent processing apparatus 50 or the intent processing apparatus 60 provided in the embodiments of this application may be configured to implement the functions of the management device in the methods implemented in the foregoing embodiments of this application. For ease of description, only a part related to this embodiment of this application is shown. For specific technical details that are not disclosed, refer to the embodiments of this application.

Figure 7:
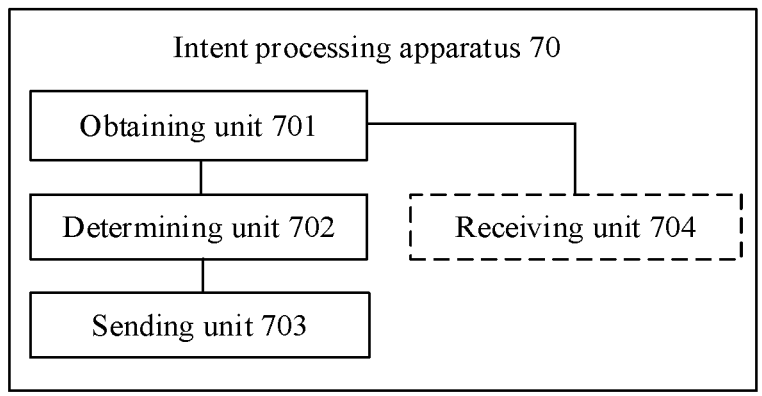
FIG. 7 is a schematic structural diagram of still another intent processing apparatus according to an embodiment of this application.

When the functional modules are obtained through division based on the corresponding functions, FIG. 7 is a schematic diagram of a possible structure of an intent processing apparatus 70 deployed on the requirement device in the foregoing embodiments. The intent processing apparatus 70 may be a requirement device itself, or may be a functional module or a chip in the requirement device. As shown in FIG. 7, the intent processing apparatus 70 may include an obtaining unit 701, a determining unit 702, and a sending unit 703. The obtaining unit 701 is configured to perform the process S404 in FIG. 4A. The determining unit 702 is configured to perform the process S405 in FIG. 4A. The sending unit 703 is configured to perform the process S406 in FIG. 4A. All related content of the steps in the foregoing method embodiments may be cited in function descriptions of corresponding functional modules, and details are not described herein again.

Further, as shown in FIG. 7, the intent processing apparatus 70 may further include a receiving unit 704, configured to perform the processes S408c and S411 in FIG. 4B.

Figure 8:
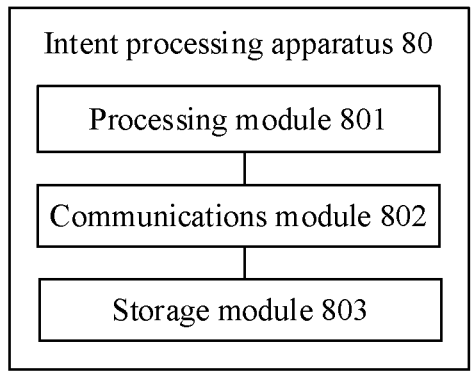
FIG. 8 is a schematic structural diagram of yet another intent processing apparatus according to an embodiment of this application.

When an integrated unit is used, FIG. 8 is a schematic diagram of a possible structure of an intent processing apparatus 80 deployed on the requirement device in the foregoing embodiments. The intent processing apparatus 80 may be a requirement device itself, or may be a functional module or a chip in the requirement device. The intent processing apparatus 80 may include a processing module 801 and a communications module 802. The processing module 801 is configured to control and manage an action of the intent processing apparatus 80. For example, the processing module 801 is configured to perform the processes S404 and S405 in FIG. 4A. The processing module 801 is further configured to perform the processes S406, S408c, and S411 in FIG. 4A and FIG. 4B by using the communications module 802. The intent processing apparatus 80 may further include a storage module 803, configured to store program code and data of the intent processing apparatus 80.

The processing module 801 may be the processor 301 in a physical structure of the communications apparatus 30 shown in FIG. 3, and may be a processor or a controller. For example, the processing module 801 may be a CPU, a general-purpose processor, a DSP, an ASIC, an FPGA or another programmable logic device, a transistor logic device, a hardware component, or any combination thereof. The processor 801 may implement or execute various example logical blocks, modules, and circuits described with reference to content disclosed in this application. Alternatively, the processor module 801 may be a combination of processors implementing a computing function, for example, a combination of one or more microprocessors, or a combination of a DSP and a microprocessor. The communications module 802 may be the communications interface 304 in the physical structure of the communications apparatus 30 shown in FIG. 3. The communications module 802 may be a communications port, or may be a transceiver, a transceiver circuit, a communications interface, or the like. Alternatively, the communications interface may communicate with another device by using the foregoing element that has a transceiver function. The foregoing element that has the transceiver function may be implemented by using an antenna and/or a radio frequency apparatus. The storage module 803 may be the memory 303 in the physical structure of the communications apparatus 30 shown in FIG. 3.

When the processing module 801 is a processor, the communications module 802 is a communications interface, and the storage module 803 is a memory, the intent processing apparatus 80 in FIG. 8 in this embodiment of this application may be the communications apparatus 30 shown in FIG. 3.

As described above, the intent processing apparatus 70 or the intent processing apparatus 80 provided in the embodiments of this application may be configured to implement the functions of the requirement device in the methods implemented in the foregoing embodiments of this application. For ease of description, only a part related to this embodiment of this application is shown. For specific technical details that are not disclosed, refer to the embodiments of this application.

Figure 9:
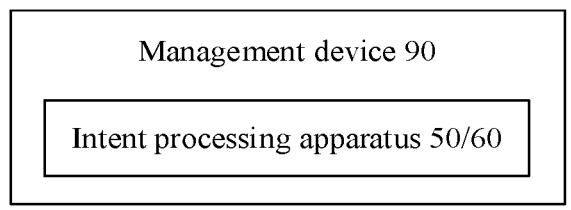
FIG. 9 is a schematic structural diagram of a management device according to an embodiment of this application.

As shown in FIG. 9, an embodiment of this application provides a management device 90, including an intent processing apparatus 50 or an intent processing apparatus 60.

Figure 10:
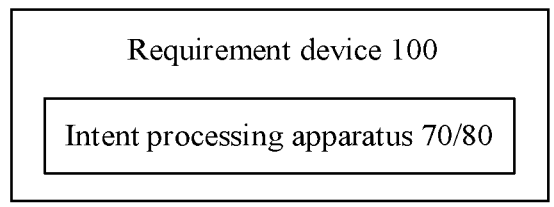
FIG. 10 is a schematic structural diagram of a requirement device according to an embodiment of this application.

As shown in FIG. 10, an embodiment of this application provides a requirement device 100, including an intent processing apparatus 70 or an intent processing apparatus 80.

Figure 11:
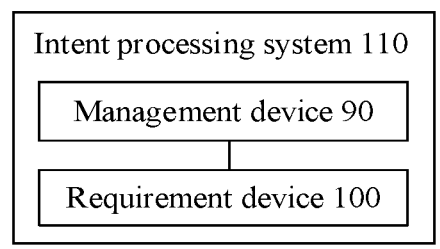
FIG. 11 is a schematic structural diagram of an intent management system according to an embodiment of this application.

As shown in FIG. 11, an embodiment of this application provides an intent processing system 110, including a management device 90 and a requirement device 100.

Figure 12:
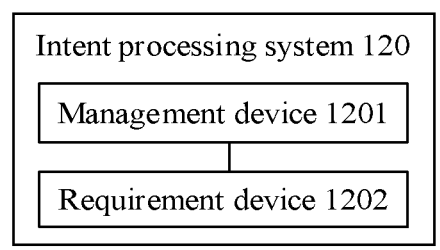
FIG. 12 is a schematic structural diagram of another intent management system according to an embodiment of this application.

As shown in FIG. 12, an embodiment of this application provides an intent processing system 120, including a management device 1201 and a requirement device 1202.

An IDMS interface is configured for the management device 1201. The requirement device 1202 is configured to: obtain, through the IDMS interface of the management device 1201, an intent model required by the requirement device from the management device, where the intent model includes an intent object, an intent action, and an intent-specific parameter; determine an intent based on the intent model, where the intent includes information about the intent object, information about the intent action, and information about the intent-specific parameter, and the intent is used to indicate the management device 1201 to perform, on an object indicated by the information about the intent object, an action indicated by the information about the intent action; and send the determined intent to the management device 1201 through the IDMS interface. The management device 1201 is configured to: receive the intent from the requirement device 1202 through the IDMS interface; obtain a configuration parameter based on the received intent; and configure, based on the configuration parameter, a network or a service managed by the management device 1201.

In another implementation of this embodiment, a computer-readable storage medium is provided. The computer-readable storage medium stores instructions. When the instructions are executed, the intent processing method in the foregoing method embodiments is performed.

In another implementation of this embodiment, a computer program product including instructions is provided. When the instructions are executed, the intent processing method in the foregoing method embodiments is performed.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

Persons skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer. It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementations. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware plus a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

Finally, it should be noted that the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An intent processing method, wherein the method comprises:
   sending, by a management device, an intent capability of the management device to a requirement device through an intent-driven management service (IDMS) interface, wherein the intent capability of the management device comprises an allowed value of an intent object allowed by the management device and an allowed value of an intent-specific parameter allowed by the management device;
   receiving, by the management device, through the IDMS interface from the requirement device, an intent, wherein the intent comprises information about an intent object in the allowed value of the intent object allowed by the management device, information about an intent action, and information about an intent-specific parameter in the allowed value of the intent-specific parameter allowed by the management device, the information about the intent action indicates the intent action that is to be performed on the intent object;
   determining whether the intent comprising the information about the intent object, the information about the intent action, and the information about the intent-specific parameter can be satisfied based on a priority of the intent;
   when the intent can be satisfied:
      obtaining a configuration parameter based on the intent;
      configuring, based on the configuration parameter, a managed network or a managed service; and
      sending a second notification message to the requirement device, wherein the second notification message is used to indicate that the intent has been executed, and the second notification message comprises an identifier (ID) of the intent;
   when the intent cannot be satisfied, sending a first notification message to a requirement device, wherein the first notification message is used to indicate that the intent cannot be satisfied, and the first notification message comprises cause information as to why the intent cannot be satisfied.

2. The method according to claim 1, wherein the intent capability further comprises an allowed value of an intent action allowed by the management device, and the information about the intent action is in the allowed value of the intent action.

3. The method according to claim 2, wherein:
   the sending of the intent model to the requirement device comprises sending the intent model supported by the management device to the requirement device; or
   the method further comprises: receiving an intent query request from the requirement device, wherein the intent query request comprises intent model requirement information and the sending of the intent model to the requirement device comprises sending, to the requirement device, an intent model indicated by the intent model requirement information.

4. The method according to claim 1, wherein
   the information about the intent action comprises at least one of the following: add, remove, provisioning, allocate, optimization, load balance, cell instant update, frequency update, cell instant delete, or physical cell update.

5. The method according to claim 1, wherein the ID of the intent is based on the intent object, the intent action, and the intent-specific parameter of the intent.

6. The method according to claim 1, wherein the intent object comprises at least one of the following content: end user, end user group, tenant, network, network slice, sub-network, non-public network, cell, network element, network function, service, or location area.

7. The method according to claim 1, further comprising:
   receiving, by the requirement device, the intent capability;
   determining, by the requirement device, the intent based on the intent capability; and
   sending, by the requirement device, the intent to the management device through the IDMS interface.

8. An intent processing system, wherein the system comprises a management device and a requirement device, and an intent-driven management service (IDMS) interface is configured for the management device, wherein
   the requirement device is configured to:
      receive, from the management device, an intent capability through an intent-driven management service (IDMS), wherein the intent capability comprises an allowed value of an intent object allowed by the management device and an allowed value of an intent-specific parameter allowed by the management device;
      determine an intent based on the intent capability, wherein the intent comprises information about an intent object in the allowed value of the intent object allowed by the management device, information about an intent action, and information about the intent-specific parameter in the allowed value of the intent-specific parameter allowed by the management device, and the intent is used to indicate to the management device to perform, on an object indicated by the information about the intent object, an action indicated by the information about the intent action; and
      send the intent to the management device through the IDMS interface; and
   the management device is configured to:
      send the intent capability to the requirement device through the IDMS interface;
      receive the intent from the requirement device through the IDMS interface;
      determine whether the intent comprising the information about the intent object, the information about the intent action, and the information about the intent-specific parameter can be satisfied based on a priority of the intent;
      when the intent can be satisfied:
         obtain a configuration parameter based on the intent;
         configure, based on the configuration parameter, a network or a service managed by the management device; and
         sending a second notification message to the requirement device, wherein the second notification message is used to indicate that the intent has been executed, and the second notification message comprises an identifier (ID) of the intent;
      when the intent cannot be satisfied, send a first notification message to the requirement device, wherein the first notification message is used to indicate that the intent cannot be satisfied, and the first notification message comprises cause information about why the intent cannot be satisfied.

9. The system according to claim 8, wherein the intent capability further comprises an allowed value of an intent action, and the information about the intent action is in the allowed value of the intent action.

10. The system according to claim 8, wherein
the information about the intent action comprises at least one of the following: add, remove, provisioning, allocate, optimization, load balance, cell instant update, frequency update, cell instant delete, or physical cell update.

11. The system according to claim 8, wherein the ID of the intent is based on the intent object, the intent action, and the intent-specific parameter of the intent.

12. The system according to claim 8, wherein the intent object comprises at least one of the following content: end user, end user group, tenant, network, network slice, subnetwork, non-public network, cell, network element, network function, service, or location area.

13. An intent processing apparatus, comprising:
at least one memory, configured to store instructions; and
at least one processor, wherein when executing the instructions, the at least one processor is configured to:
send, an intent capability to a requirement device through an intent-driver management service (IDMS), wherein the intent capability comprises an allowed value of an intent object allowed by a management device and an allowed value of an intent-specific parameter allowed by the management device;
receive, through the IDMS interface from the requirement device, an intent, wherein the intent comprises information about an intent object in the allowed value of the intent object allowed by the management device, information about an intent action, and information about an intent-specific parameter in the allowed value of the intent object allowed by the management device, and the intent is used to indicate the intent action that is to be performed on the intent object;
determine whether the intent comprising the information about the intent object, the information about the intent action, and the information about the intent-specific parameter can be satisfied based on a priority of the intent;
when the intent can be satisfied:
obtain a configuration parameter based on the intent;
configure, based on the configuration parameter, a managed network or a managed service; and
sending a second notification message to the requirement device, wherein the second notification message indicates that the intent has been executed, and the second notification message comprises an identifier (ID) of the intent;
when the intent cannot be satisfied, send a first notification message to a requirement device, wherein the first notification message indicates that the intent cannot be satisfied, and the first notification message comprises cause information about why the intent cannot be satisfied.

14. The apparatus according to claim 13, wherein the intent capability further comprises an allowed value of an intent action allowed by the management device, and the information about the intent action is in the allowed intent action.

15. The apparatus according to claim 13, wherein:
the information about the intent action comprises at least one of the following: add, remove, provisioning, allocate, optimization, load balance, cell instant update, frequency update, cell instant delete, or physical cell update.

16. The apparatus according to claim 13, wherein the intent object comprises at least one of the following content: end user, end user group, tenant, network, network slice, subnetwork, non-public network, cell, network element, network function, service, or location area.

* * * * *

UNITED STATES PATENT AND TRADEMARK OFFICE
CERTIFICATE OF CORRECTION

PATENT NO. : 12,309,043 B2
APPLICATION NO. : 17/400787
DATED : May 20, 2025
INVENTOR(S) : Ruiyue Xu Page 1 of 1

It is certified that error appears in the above-identified patent and that said Letters Patent is hereby corrected as shown below:

On the Title Page (57), Abstract, Line 2, delete "and a system, to" and insert -- to --, therefor.

Signed and Sealed this
Ninth Day of September, 2025

Coke Morgan Stewart
*Acting Director of the United States Patent and Trademark Office*